(12) United States Patent
Graham et al.

(10) Patent No.: US 7,167,703 B2
(45) Date of Patent: Jan. 23, 2007

(54) WIRELESS MOBILE IMAGE MESSAGING

(75) Inventors: Tyrol R. Graham, Seattle, WA (US); Eric J. Hull, Seattle, WA (US); Jonathan O. Nelson, Kirkland, WA (US)

(73) Assignee: Wildseed, Ltd., Seattle, WA (US)

( * ) Notice: Subject to any disclaimer, the term of this patent is extended or adjusted under 35 U.S.C. 154(b) by 720 days.

(21) Appl. No.: 10/255,860

(22) Filed: Sep. 25, 2002

(65) Prior Publication Data
US 2003/0060240 A1 Mar. 27, 2003

Related U.S. Application Data

(60) Provisional application No. 60/325,094, filed on Sep. 25, 2001.

(51) Int. Cl.
*H04M 3/42* (2006.01)
*H04M 1/00* (2006.01)
*H04Q 7/20* (2006.01)

(52) U.S. Cl. ............... 455/415; 455/466; 455/566; 349/93.23; 349/142.17; 349/142.06

(58) Field of Classification Search ........... 455/566, 455/403, 404.2, 412.1, 412.2, 414.1, 414.2, 455/414.4, 456.1, 456.3, 458, 463
See application file for complete search history.

(56) References Cited

U.S. PATENT DOCUMENTS

| 5,319,363 A | * | 6/1994 | Welch et al. ......... 340/825.36 |
| 5,510,907 A | | 4/1996 | Koichi |
| 5,848,373 A | * | 12/1998 | DeLorme et al. ........... 701/200 |
| 6,249,689 B1 | | 6/2001 | Aizawa |
| 6,430,409 B1 | | 8/2002 | Rossmann |
| 6,512,448 B1 | | 1/2003 | Rincon et al. |
| 6,757,521 B1 | * | 6/2004 | Ying ....................... 455/67.11 |
| 6,801,793 B1 | * | 10/2004 | Aarnio et al. .............. 455/566 |
| 6,865,386 B1 | * | 3/2005 | Aoyama et al. ........... 455/415 |
| 6,888,927 B1 | * | 5/2005 | Cruickshank et al. ..... 379/88.11 |
| 6,920,637 B1 | * | 7/2005 | Mason et al. .............. 719/318 |
| 2003/0013483 A1 | * | 1/2003 | Ausems et al. ............ 455/556 |

* cited by examiner

*Primary Examiner*—Tony T. Nguyen
(74) *Attorney, Agent, or Firm*—Schwabe, Williamson & Wyatt, PC

(57) ABSTRACT

Non-verbal communications between users of wireless mobile devices are facilitated using image messages. An image message may e.g. convey information about the sender user, in particular, current information about the sender user. In one aspect, a user may select an image message category, and select an image message among the image messages of the selected image message category for transmission, to quickly, efficiently and graphically convey (current) information about the user. The process may be performed to form a mixed media message. Received image message to convey current information may be aged via time and/or color displays.

38 Claims, 15 Drawing Sheets

WIRELESS MOBILE IMAGE MESSAGING

RELATED APPLICATION

The present application is the non-provisional application of provisional application No. 60/325,094 filed Sep. 25, 2001, and titled "Method and Apparatus for Communicating Image Messages between Users of Mobile Devices", and claims priority to said provisional application. The specification of the provisional application is hereby fully incorporated by reference.

FIELD OF THE INVENTION

The present invention relates to mobile communication devices, and more specifically, the invention relates to sending and receiving image messages between users of mobile devices.

BACKGROUND OF THE INVENTION

Since their introduction, the number of services and features for cellular telephones has steadily increased while the cost of ownership and operation has decreased. At first, these mobile telecommunication devices operated on analog wireless networks that enabled voice communication and simple paging features. Later, digital wireless networks were introduced for cellular telephones to provide more advanced features for voice and data communication, such as encryption, caller identification and transmitting and receiving short message service (SMS) text messages. More recently, some cellular telephones enable the browsing of web pages on the Internet or other on-line services.

The functionality of cellular telephones continues to increase. Some cellular telephones incorporate many of the features originally provided for in handheld electronic devices, such as personal digital assistants (PDAs). Relatively simple PDA features such as keeping a list of contacts, a calendar, appointments, and the like have been generally integrated into recent cellular telephone models.

Along with the increased services and features, it is common for individuals to own a cellular telephone and use it for daily communications. Individuals are no longer restricting the use of their cellular telephone to strictly business or emergency calls. They are talking with their friends about what they are currently doing, what they are listening to on the radio, watching on television, viewing on the World Wide Web, and the like. The user may want tell their friends what they are current doing and experiencing, and to know what their friends are doing, all without having to make numerous phone calls.

However, unlike desktop computers, laptop computers and PDA, cellular telephones typically have limited input capabilities. That is, inputs typically have to be made through a limited number of inputs keys, e.g. through a 12-key numeric keypad. Thus, a great need exists to enable the rich functionalities, such as non-verbal conversing with users of other cellular telephones, to be consumable in an efficient and friendly manner under the context of limited input keys.

SUMMARY OF THE INVENTION

The invention is directed to towards facilitating non-verbal communications between users of wireless mobile devices, such as cellular telephones, using image messages. The image message may e.g. convey information about the sender users. In particular, the image message may convey current information about the sender users.

In one aspect, the invention is directed towards facilitating a user of a wireless mobile device in efficiently selecting an image message category, and selecting an image message among the image messages of the selected image message category for transmission, to quickly, efficiently and graphically convey information about the user, in particular, current information about the user.

The image message system may include image message categories such as a location image message category, a mood image message category, an activity image message category, a random image message category, and so forth.

In another aspect, the invention is directed towards sending the image message in a reduced bandwidth consumption manner, by sending an identifier of the image message. A recipient employing a wireless mobile device equipped with the invention may locally retrieve and render the image message based on the image message identifier provided.

In yet another aspect, the invention is directed towards tracking and indicating for a user of a wireless mobile device, image messages sent/received, and the amount of time since the image messages have been sent/received.

In yet another aspect, the invention is directed towards, determining an illuminable input key corresponding to a sender of an image message, and illuminating the corresponding illuminable input key to indicate receipt of an image message from the corresponding sender user.

In various embodiments, different colors may also be employed to indicate an age of a received image message from the corresponding sender.

In yet another aspect, the invention is directed towards requesting and receiving updates to received image messages to update current information about sender users.

In yet another aspect, the invention is directed towards the employment of mixed media messages in communications. A mixed media message includes text and images. A mixed media message may also further include audio, video and messages of other media types.

In various embodiments, a mixed media message is sent in a full text form, with the images being replaced by their textual equivalents. In various embodiments, the textual equivalents may be identified as having equivalent images. Resultantly, the received message may be rendered in a full text form (with images replaced by their textual equivalents) or a mixed media form (with the images restored), depending on the capabilities of the receiving wireless mobile device, e.g., legacy devices versus devices incorporated with the present invention.

DETAILED DESCRIPTION OF EMBODIMENTS OF THE INVENTION

The present invention includes facilitating non-verbal communications between users of wireless mobile devices, using image messages.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Parts of the description will be presented in wireless mobile telephony terms, such as data, flag, transmit, receive, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through electrical and/or optical components of a processor and its subsystems.

Part of the descriptions will employ various abbreviations, including but are not limited to:

| | |
|---|---|
| PST | Public Switching Telephony Network |
| SMS | Short Message Service |

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Exemplary System/Environment

Figure 1:
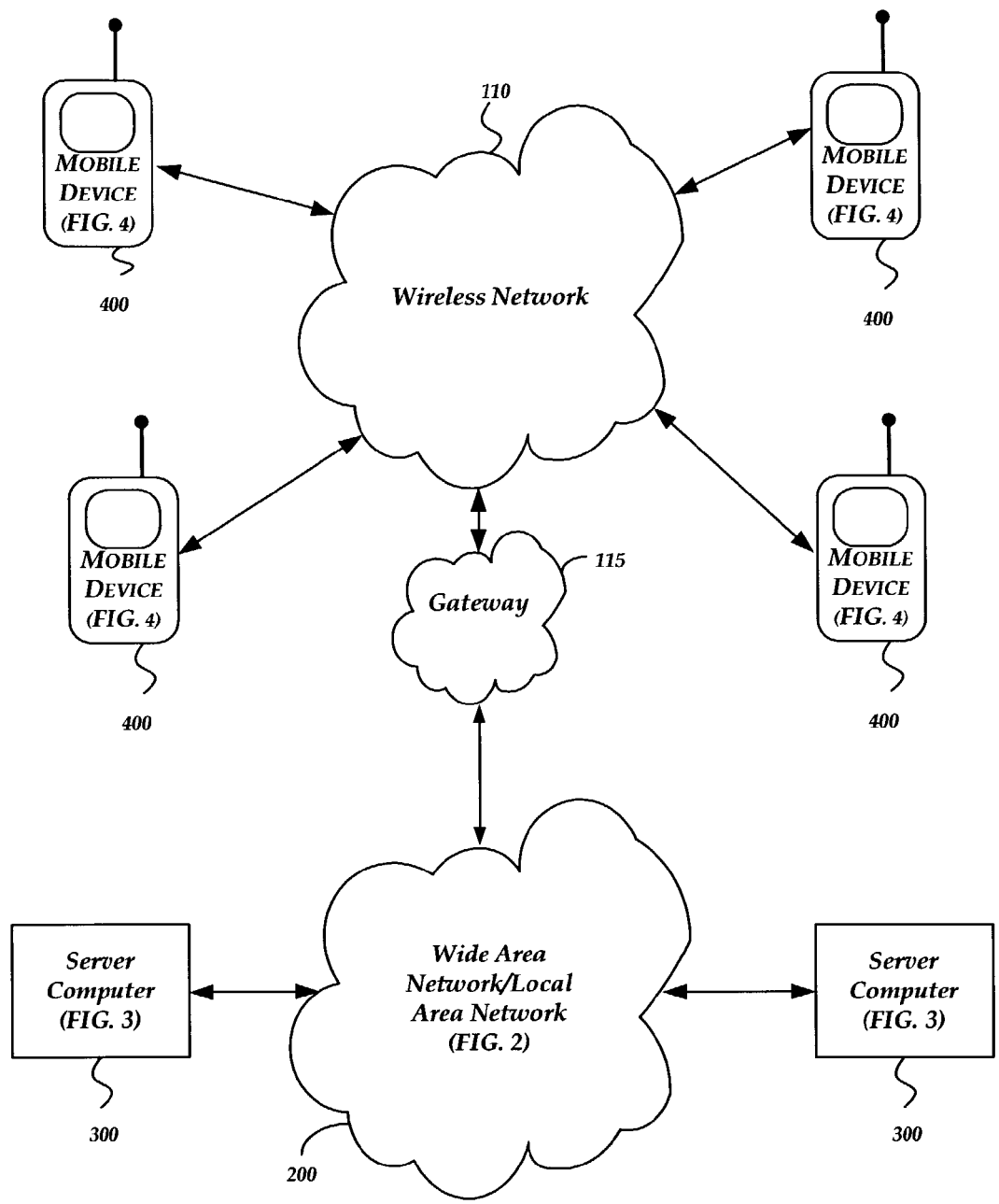
FIG. 1 is a schematic diagram that shows an exemplary system overview.

With reference to FIG. 1, an exemplary system in which the invention operates includes wireless mobile devices 400 (hereinafter simply mobile devices), wireless network 110, gateway 115, wide area network (WAN)/local area network (LAN) 200 and one or more server computers 300.

Figure 4:
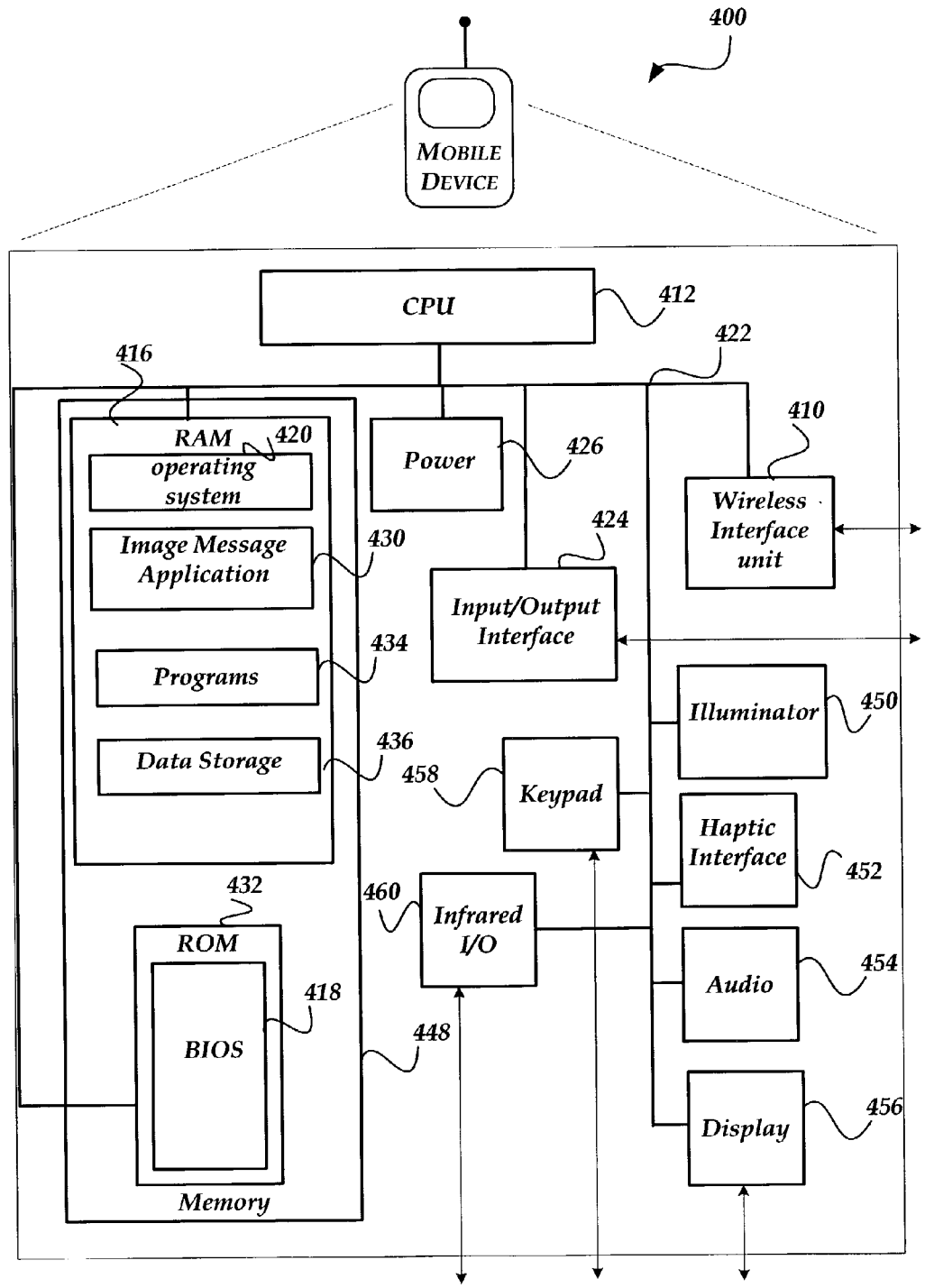
FIG. 4 is a schematic diagram that illustrates an exemplary mobile device.
Figure 5:
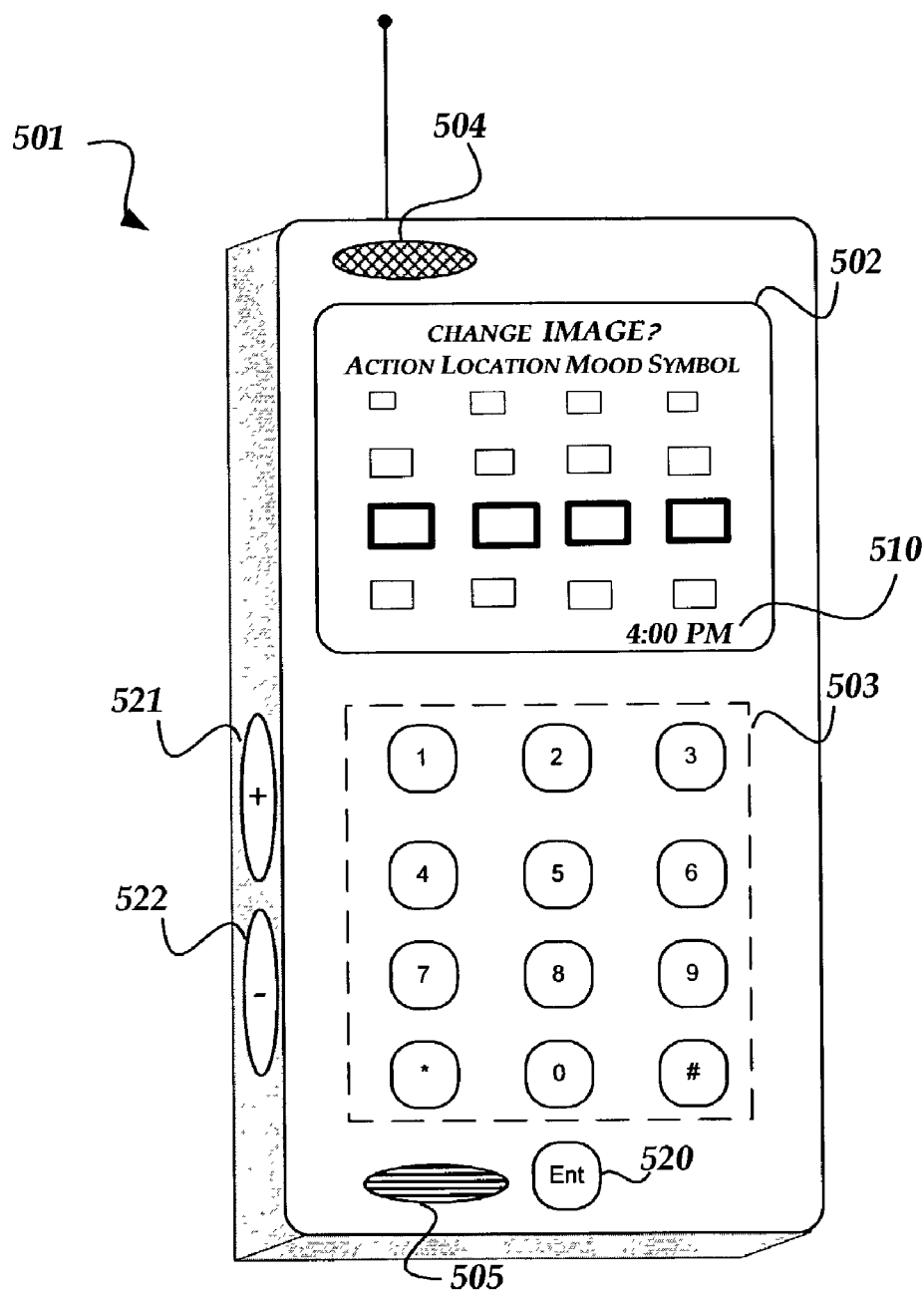
FIG. 5 is a schematic diagram illustrating an exemplary embodiment of a mobile device arranged in an image message edit mode.

Mobile devices 400 are coupled to wireless network 110 and are described in more detail in conjunction with FIG. 4 and FIG. 5. Generally, mobile devices 400 include any device capable of connecting to a wireless network such as wireless network 110. Such mobile devices include cellular telephones, smart phones, pagers, radio frequency (RF) devices, infrared (IR) devices, citizen band radios (CBs), integrated devices combining one or more of the preceding devices, and the like. Mobile devices 400 may also include other devices that have a wireless interface such as PDAs, handheld computers, personal computers, multiprocessor systems, microprocessor-based or programmable consumer electronics, network PCs, wearable computers, and the like.

Wireless network 110 transports information to and from mobile devices capable of wireless communication. Wireless network 110 may include both wireless and wired components. For example, wireless network 110 may include wireless cellular sites (not shown) that are coupled to another wired telephone network. Typically, a cellular site carries communication to and from cellular telephones, pagers, and other mobile devices; and the wired telephone network carries communication to landline telephones, long-distance communication links, and the like.

Wireless network 110 is coupled to WAN/LAN through gateway 115. Gateway 115 routes information between wireless network 110 and WAN/LAN 200. For example, a user using a mobile device may browse the Internet by calling a certain number or tuning to a particular frequency. Upon receipt of the number, wireless network 110 is configured to pass information between the wireless device and gateway 115. Gateway 115 translates requests for web pages from mobile devices into hypertext transfer protocol (HTTP) messages, which may then be sent to resources coupled to WAN/LAN 200. Gateway 115 may also translate responses to such messages into a protocol compatible with the requesting mobile device. Additionally, Gateway 115 may be used to translate exchanges of other types of messages, e.g., SMS (short message service) messages, between mobile devices 400 that are facilitated by resources (servers) coupled to WAN/LAN 200.

Figure 2:
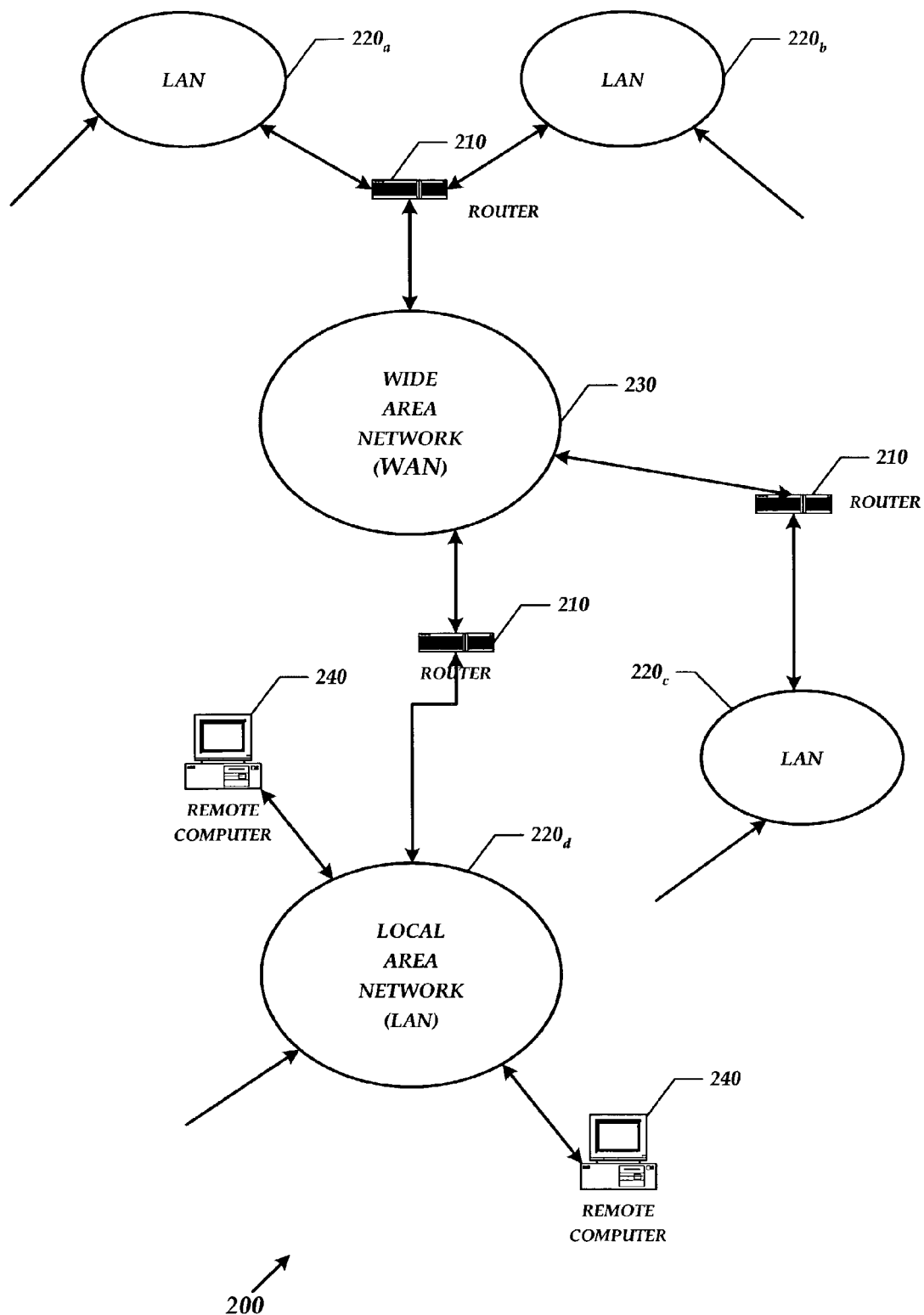
FIG. 2 is a schematic diagram that illustrates an exemplary system overview in which local area networks and a wide area network are interconnected by routers.

Typically, WAN/LAN 200 transmits information between computing devices as described in more detail in conjunction with FIG. 2. One example of a WAN is the Internet, which connects millions of computers over a host of gateways, routers, switches, hubs, and the like. An example of a LAN is a network used to connect computers in a single office. A WAN may connect multiple LANs. Server computers 300 are coupled to WAN/LAN 200 through communication mediums. Server computers 300 provide access to information and services as described in more detail in conjunction with FIG. 3.

FIG. 2 shows another exemplary system in which the invention operates in which a number of local area networks ("LANs") 220$_{a\text{-}d}$ and wide area network ("WAN") 230 interconnected by routers 210. Routers 210 are intermediary devices on a communications network that expedite message delivery. On a single network linking many computers through a mesh of possible connections, a router receives transmitted messages and forwards them to their correct destinations over available routes. On an interconnected set of LANs—including those based on differing architectures and protocols—, a router acts as a link between LANs, enabling messages to be sent from one to another. Communication links within LANs typically include twisted wire pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known to those skilled in the art.

Furthermore, computers, such as remote computer 240, and other related electronic devices can be remotely connected to either LANs $220_{a-d}$ or WAN 230 via a modem and temporary telephone link. The number of WANs, LANS, and routers in FIG. 2 may be increased or decreased without departing from the spirit or scope of this invention. As such, it will be appreciated that the Internet itself may be formed from a vast number of such interconnected networks, computers, and routers and that an embodiment of the invention could be practiced over the Internet without departing from the spirit and scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

The Internet has recently seen explosive growth by virtue of its ability to link computers located throughout the world. As the Internet has grown, so has the WWW. Generally, the WWW is the total set of interlinked hypertext documents residing on HTTP (hypertext transport protocol) servers around the world. Documents on the WWW, called pages or Web pages, are typically written in HTML (Hypertext Markup Language), or some other markup language, identified by URLs (Uniform Resource Locators) that specify the particular machine and pathname by which a file can be accessed, and transmitted from server to end user using HTTP. Codes, called tags, embedded in an HTML document associate particular words and images in the document with URLs so that a user can access another file, which may literally be halfway around the world, at the press of a key or the click of a mouse. These files may contain text (in a variety of fonts and styles), graphics images, movie files, media clips, and sounds as well as Java applets, ActiveX controls, or other embedded software programs that execute when the user activates them. A user visiting a Web page also may be able to download files from an FTP site and send messages to other users via email by using links on the Web page.

Figure 3:
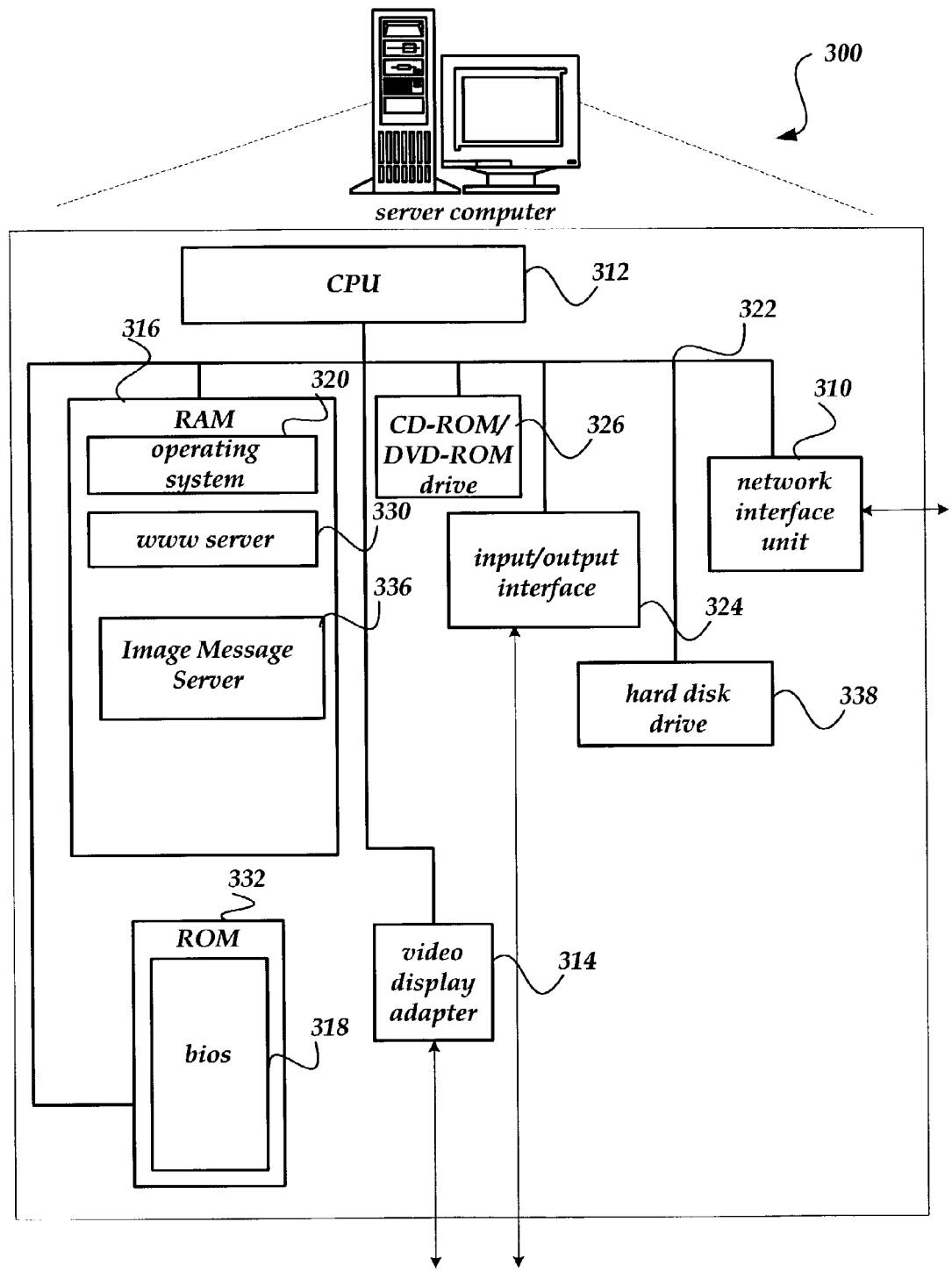
FIG. 3 is a schematic diagram that shows an exemplary server.

Server computer 300, as described in regard to FIG. 3, is a computer connected to a network and having storage facilities for storing hypertext documents for a WWW site, running administrative software (WWW server) for handling requests for the stored hypertext documents and enabling a facility (image message server) to handle image based messages communicated between mobile devices. The server computer 300 may include many more components than those shown in FIG. 3. However, the components shown are sufficient to disclose an illustrative embodiment for practicing the present invention.

As shown in FIG. 3 server computer 300 is connected to WAN/LAN 200, or other communications network, via network interface unit 310. Network interface unit 310 includes the circuitry for connecting WWW server 330 and image message server 336 to WAN/LAN 200, and is constructed for use with various communication protocols including TCP/IP and WAP. Typically, network interface unit 310 is a card contained within server computer 300.

Server computer 300 also includes processing unit 312, video display adapter 314, and a mass memory, all connected via bus 322. The mass memory generally includes RAM 316, ROM 332, and one or more permanent mass storage devices, such as hard disk drive 328, a tape drive, CD-ROM/DVD-ROM drive 326, and/or a floppy disk drive. The mass memory stores operating system 320 for controlling the operation of server computer 300. This component may comprise a general purpose server operating system such as UNIX, LINUX™, or Microsoft WINDOWS NT®. Basic input/output system ("BIOS") 318 is also provided for controlling the low-level operation of server computer 300.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for providing a WWW site and managing image messages. More specifically, the mass memory stores applications including WWW server 330 and image message server 336. Generally, image message server 336 includes instructions for facilitating the communication of image based messages communicated between mobile devices. WWW server 330 includes computer executable instructions which, when executed on server computer 300, generate WWW browser displays, including performing the logic described elsewhere in the specification.

Server computer 300 also comprises input/output interface 324 for communicating with external devices, such as a mouse, keyboard, scanner, or other input devices not shown in FIG. 3. Likewise, server computer 300 may further comprise additional mass storage facilities such as CD-ROM/DVD-ROM drive 326 and hard disk drive 328. Hard disk drive 328 is utilized by server computer 300 to store, among other things, applications, databases, and data used by WWW server 330 and image message server 336.

Image message server 336 may include a library or database of predetermined images that are organized by categories and one or more lists of preselected users designated to receive selected images. Additionally, image message server 336 may incorporate facilities for handling image messages that are included in SMS messages and wireless protocols, such as WAP.

FIG. 4 shows an exemplary mobile device 400, according to one embodiment of the invention. In one embodiment, mobile device 400 is a cellular telephone that is arranged to send and receive messages. In particular, mobile device 400 may be arranged to send and receive SMS messages that can include data representing an image. Of course, other messaging services that can include data representing an image may also be employed with mobile device 400.

Mobile device 400 may include many more components than those shown in FIG. 4. However, the components shown are sufficient to disclose an illustrative embodiment for practicing the present invention. As shown in the figure, mobile device 400 includes processing unit 412, memory 448, RAM 416, ROM 432, operating system 420, image message application 430, programs 434, data storage 436, bios 418, power 426, input/output interface 424, wireless interface unit 410, illuminator 450, haptic interface 452, audio 454, display 456, keypad 458 and infrared input/output 460.

Mobile device 400 may connect to WAN/LAN 200, or other communications network, via wireless interface unit 410. Wireless interface unit 410 includes circuitry for connecting mobile device 400 to wireless network 110, and is constructed for use with various communication protocols including TCP/IP and WAP. Wireless interface unit 410 may include a radio layer (not shown) that is arranged to send and receive radio frequency communications. Typically, wireless interface unit 410 connects mobile device 400 to other mobile devices, via a telecommunications carrier or service provider. Also, wireless interface unit 410 may be arranged to communicate with other mobile devices without assistance from a carrier or service provider. For example, wireless interface unit 410 may support a wireless protocol such as IEEE 802.11b and the like for communicating directly with other mobile devices.

Mass memory 448 generally includes RAM 416, ROM 432, and one or more data storage units 436. The mass memory stores operating system 420 for controlling the operation of mobile device 400. It will be appreciated that this component may comprise a general purpose operating system such as a version of UNIX, LINUX™, or Microsoft WINDOWS®. Basic input/output system ("BIOS") 418 is also provided for controlling the low-level operation of mobile device 400.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores application code and data used by mobile device 400. More specifically, the mass memory stores image message application 430, and programs 434. Image message application 430 may be loaded into memory 448 and run under control of operating system 420. Also, programs 434 may include computer executable instructions which, when executed by mobile device 400, transmit and receive WWW pages, e-mail, audio, video, and enable telecommunication with another user of another mobile device.

Mobile device 400 also comprises input/output interface 424 for communicating with external devices, such as a headset, or other input or output devices not shown in FIG. 4. Data storage 436 can be utilized by mobile device 400 to store, among other things, programs 434, image message application 436, databases and/or libraries of images, lists and other data. Keypad 458 may be any input device arranged to receive input from a user. For example, keypad 458 may include a push button numeric dial, or a keyboard. Keypad 458 may also include command buttons that are associated with selecting and sending images. Display 456 may be a liquid crystal display (LCD), gas plasma, light emitting diode (LED), or any other type of display used with a mobile device. Display 456 may also include a touch sensitive screen arranged to receive input from an object such as a stylus or a digit from a human hand. Additionally, infrared input/output 460 may be used to send and receive infrared commands to/from other devices.

Power supply 426 provides power to mobile device 400. A rechargeable or non-rechargeable battery may be used to provide power. The power may also be provided by an external power source, such as an AC adapter or a powered docking cradle that supplements and/or recharges a battery.

As shown, mobile device 400 includes illuminator 450, haptic interface 452, and audio interface 454. Illuminator 450 may remain active for specific periods of time or in response to events. For example, when illuminator 450 is active, it may backlight the buttons on keypad 459 and stay on while the mobile device is powered. Also, illuminator 450 may backlight these buttons in various patterns when particular actions are performed, such as selecting or sending images. These patterns may be predetermined or random, e.g., a happy face or starburst. Illuminator 450 may also cause light sources positioned within a transparent or translucent case of the mobile device to illuminate in response to actions.

Audio interface 454 is arranged to produce and receive audio signals such as the sound of a human voice. For example, audio interface 454 may be coupled to a speaker and microphone (not shown) to enable telecommunication with others and/or generate an audio acknowledgement for some action. Haptic interface 452 is arranged to provide sensory feedback to a user of the mobile device. For example, the haptic interface may be employed to vibrate the mobile device in a particular way when images were sent to other users of mobile devices; and vibrate in another way when images are received by the mobile device from another user.

FIG. 5 illustrates an exemplary embodiment of mobile device 501 configured in a mode to facilitate efficient non-verbal communications with users of other mobile devices, using image messages having one or more images. The image messages, more specifically, may convey information about the user of mobile device 501.

Mobile device 501 is shown having a speaker 504, microphone 505, display 502 and a set of 12 input buttons 503 that are arranged as a keypad. Mobile device 501 also includes three command buttons: enter button 520, scroll-up button 521 and scroll-down button 522. Enter button 520 is employed for selecting images, sending selected images to other mobile devices, and performing other actions. Scroll-up button 521 and scroll-down button 522 enable the up/down scrolling of images displayed by display 502 in the image message edit mode.

Timer 510 indicates an amount of elapsed time when an image was last sent by the user to other users. In an alternate embodiment, timer 510 may simply denote the time an image was last sent by the user to other users.

When image message edit mode is selected, selectable images are displayed in display 502. Although four columns and multiple rows are shown in display 502, in other embodiments less or more columns/rows may be displayed. For example, in one embodiment, a multi-column, single row configuration may be employed. The multi-column, single row configuration provides a scrollable banner like configuration for the user.

Continuing to refer to FIG. 5, each column is associated with a separate category of images, e.g., mood, action, location, symbol and faces. Scroll-up button 521 and scroll-down button 522 are employed to shift a focus between each column. The focus changes the visual appearance of one image at a particular position in the selected column. For example, the image in the selected column may be enlarged and/or made brighter than all of the other images displayed in the column. Also, every column except the column selected by the focus may be grayed out. By activating enter button 520, a column can be selected where the focus is currently positioned.

Another embodiment provides for associating buttons in keypad 503 with columns, e.g., the 1, 2, 3, and 4 buttons could each correspond to a separate column. When any of the buttons are selected, the focus would shift to the corresponding column. Also, the button corresponding to a currently selected column could be illuminated.

When a column is selected, scroll-up button 520 and scroll-down button 521 can be employed to scroll up and down through each image in the selected column. As the images are scrolled, the focus can remain directed to a particular position in the selected column and alter the visual appearance of the image currently occupying that position. Thus, when enter button 520 is activated again, the highlighted image is selected and stored for sending in an image message to other users.

Once an image is chosen from a selected column, scroll-up button 520 and scroll-down button 521 can be used again to shift the focus between each column where other images may be selected in substantially the same manner. When the user finishes selecting images from the columns and enter button 520 is activated yet again, an image message can be sent to another user that includes a representation of all of the images selected by the user. Additionally, an image does not have to be selected from each column to generate an image message. Instead, the user may select up to four images from any of the columns for the image message. In another embodiment, image messages that include more or less than four images can be generated.

Typically, the image message includes an identification of the sender and a time that the images were sent. Also, the identification of the user can be something other than the real name of the user, e.g., a nick name or pseudonym.

A Contact List may be provided for automatically sending an image message to a group of users. The CONTACT LIST may include one or more other users that have a common relationship with the user. Also, separate CONTACT LISTs of other users can be created by a user based on different relationships, including friendship, work, school, sports, arts, music, technology and others. Also, a filter for blocking image messages from other users can be created by the user. In this case, the mobile device would not display image messages from any users included in the filter. Also, an automatic reply (predetermined image message) could be provided whenever an image message was received from another user included in the filter.

Additionally, the "Action" category for a column can include images of different activities such as eating, sleeping, kissing, reading, snowboarding, surfing, talking, partying, and playing games. The "Location" category can include images representing home, friend's house, school, car, mall, park, back seat, woods, beach, mountains, secret hideout, bathroom, theater, club, and restaurant.

Also, the "Mood" category can include images for happy, sad, bored, sleepy, angry, friendly, curious, wired, irritable, impatient, and flirty. The "Symbol" category can include images representing a crowbar, cat, aerosol can, scissors, palm tree, egg, alien head, dynamite, lightning, eraser, milk carton, flying saucer, crown, stars, tooth, pi, and monsters. The "Faces" category can include images representing a cat, unicorn, persons face, etc Also, individual images, or combinations of images, can have a specific meaning to one group of users, and another meaning to a different group.

Figure 6:
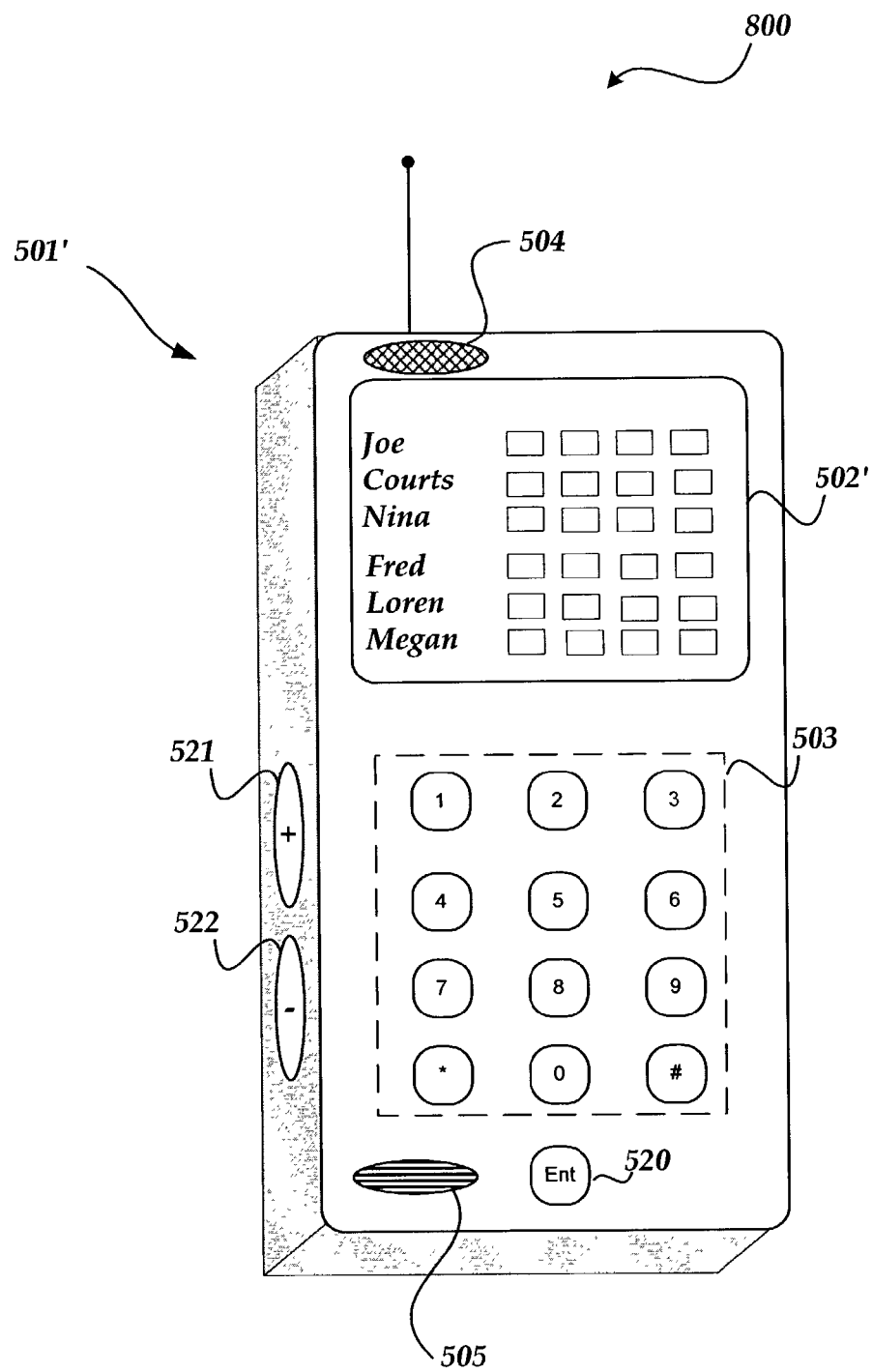
FIG. 6 is a schematic diagram illustrating an exemplary embodiment of a mobile device arranged in a received image message mode.

FIG. 6 illustrates mobile device 501' arranged in a received image message mode. Display 502' shows six received image messages with each message including four images and indicating the identity of the other user that sent the message, i.e., Joe, Courts, Nina, Fred, Loren and Megan. By activating scroll-up button 521 and scroll-down button 522, the user can scroll through other received image messages.

Although not shown, the invention provides for indicating an amount of elapsed time since the image message was sent (or alternatively the time the image message was sent) by another user to mobile device 501'. By activating enter button 520 in some sequence and/or in combination with the activation of the buttons included with keypad 503 and scroll-up button 521 and scroll-down button 522, the user can cause mobile device 501 to request and receive an update to any of the image messages received.

In various embodiments, the user may cause the mobile device to operate in either the received image message mode or the edit image message mode as discussed in regard to FIGS. 5 and 6.

Figure 7:
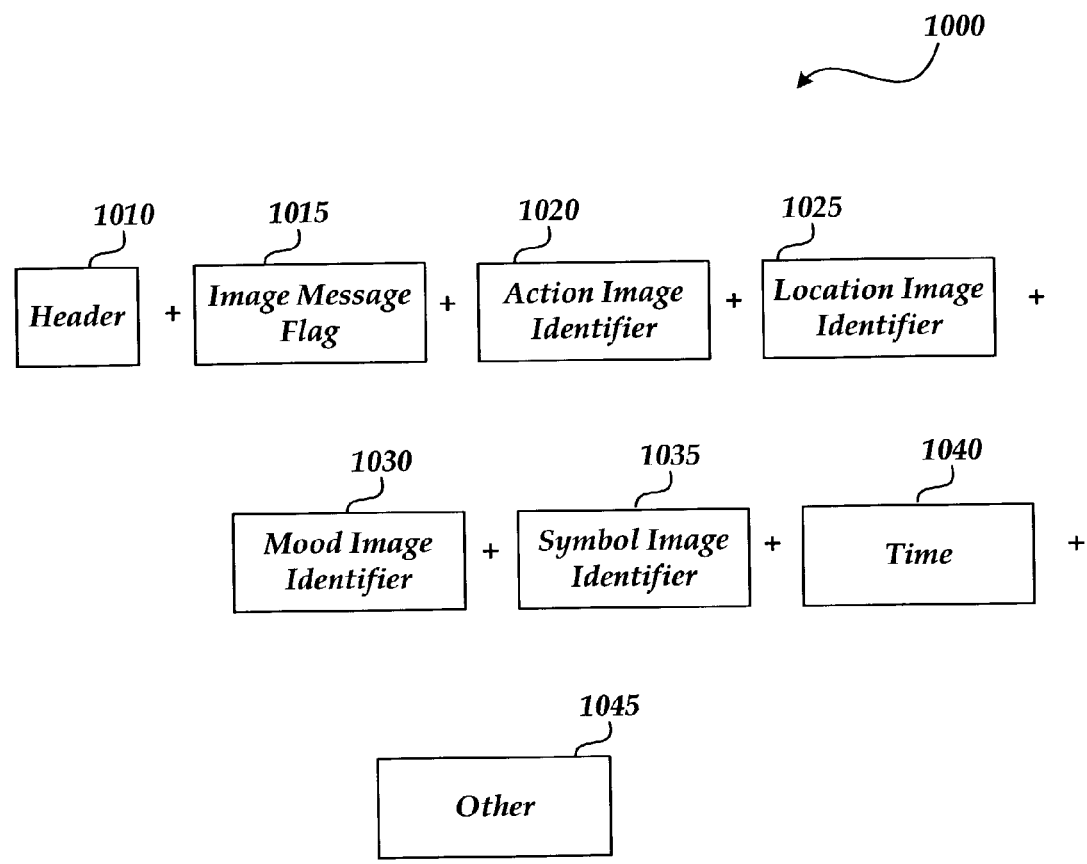
FIG. 7 is a schematic diagram illustrating an exemplary image message reporting system format.

FIG. 7 illustrates an exemplary format for an image message and is not intended to be limiting. As shown in the figure, image message format 1000 can include header 1010 and image message flag 1015. In alternate embodiments, image message flag 1015 may be part of header 1010 instead. [In alternate embodiment, there may be no header]

Further, for the embodiment, image message format 1000 includes one or more segments identifying the selected images, e.g. one or more action image identifiers 1020, one or more location image identifiers 1025, one or more mood image identifiers 1030, one or more symbol image identifiers 1035. Transmission of image identifiers, as opposed to the images themselves, advantageously reduces the bandwidth requirement for the transmissions.

[However, in alternate embodiments, the images, e.g., in the form of bit maps (as opposed to identifiers), may be transmitted instead.

For the embodiment, image message format 1000 also includes time information 1040, and possibly, other information 1045.

Header 1010, if employed, may contain protocol and routing information for the message. The header may contain information relating to the mobile device that will receive the image message. Image message flag 1015 indicates that an image message is included within a data message, such as an SMS message, and requires appropriate processing. Action identifier 1020 may be an alphanumeric character or string identifying a particular image in a library or database associated with an image message client executing on a mobile device. In substantially the same manner, segment identifiers location 1025, mood 1030, and random 1035 identify images.

In one embodiment, the image identifier could be an ASCII text of the "name" of the selected image. In another embodiment, the image identifier could be an ID or a Uniform Resource Identifier (URI) that is used to retrieve the actual image from a local repository of images on the recipient user's mobile device or from a remote server via a wireless connection. A URL is one type of a URI.

Time identifier 1040 can be an alphanumeric character or string that identifies when the image message was sent, thereby allowing the recipient mobile device to compute and display the amount of elapsed time for the received image message. Other identifier 1045 can contain other information related to the image message.

Any message protocol used by mobile devices may be used to send and receive an image message, e.g., SMS. Generally, SMS enables short text and data messages to be sent and received by mobile devices over wireless networks. These SMS messages may be sent and received on different types of wireless networks, including Global System for Mobile Communications (GSM) cellular networks.

Generally, there are three types of SMS messages: GSM character set-encoded messages (effectively 7-bit encoded text), UCS2-encoded messages (Unicode encoded 16-bit text), and 8-bit binary-encoded messages. Typically, GSM-encoded messages and UCS2-encoded messages are textual and are displayed to the user by a messaging application as soon as they are received, whereas 8-bit binary-encoded messages are generally directed at providing device-specific information, such as device configuration messages.

SMS sends and receives text messages to and from mobile devices, such as cellular telephones. The text can comprise words or numbers or an alphanumeric combination. A single short message can be up to 160 characters of text in length using default GSM alphabet coding, 140 characters when Cyrillic character set is used and 70 characters when UCS2 international character coding is used. Although SMS messages have a maximum length, the length of the user data field is not limited. The message may be split into pieces and then sent piece by piece. The device may then concatenate the pieces automatically.

SMS messages have a "User Data Header" which can contain additional information, such as source and destination port numbers (similar to TCP/IP), concatenation information that is used to support multi-part SMS messages, and the like. The User Data Header allows SMS messages to be customized.

In one embodiment, special characters or strings may be placed into an SMS message to denote that the message includes an image message. For example, the string "!IMAGE!" may be used as a flag to indicate that the SMS message includes an image message and should be processed accordingly. The specific message format employed by the invention may be any one of many different types, and the example illustrated here is merely exemplary and not limiting.

Figure 8:
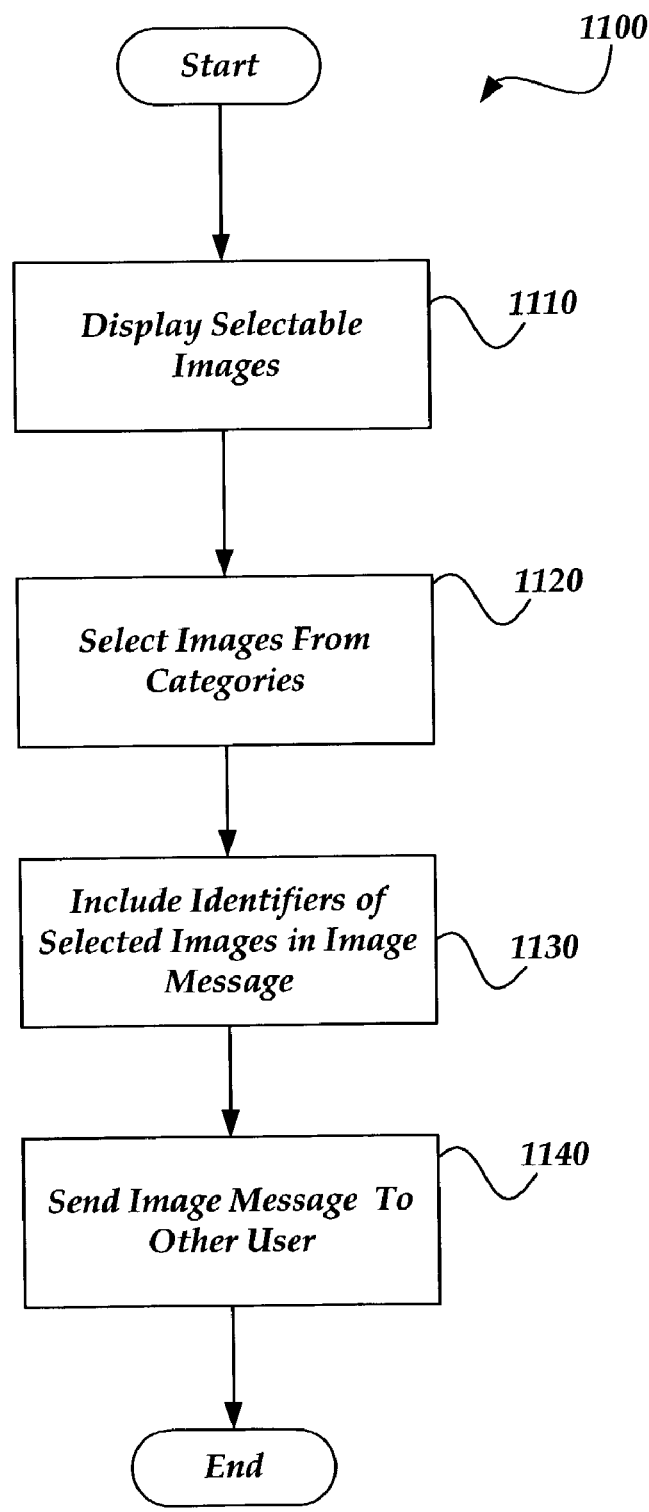
FIG. 8 is a flow chart illustrating a process for selecting images and sending the selected images in a message to other users.

FIG. 8 illustrates a flowchart 1100 for sending selected images to another user of a mobile device. Moving from a start block, the process advances to a block 1110 where images are displayed by the sender user's mobile device for selection by the sender user. The sender user may cause its mobile device to display the images for selection by selecting an image message edit mode for the mobile device. In one embodiment, the images are organized and displayed in categories, such as action, location, mood and random.

Flowing to a block 1120, at least one image is selected from a category. A focus is provided to enable the sender user to choose a category and select a particular image within a chosen category. The sender user may select from none to several images from each category. Typically, a predetermined maximum number of images may be included in an individual image message. Also, the images that are selected are associated with the user.

When all of the images have been selected, the process moves to a block 1130 where an image message is generated, e.g. in the form of one or more SMS messages. The image message includes identifiers that indicate which images have been selected, the identifier of the sender user that selected the images, as well as one or more identifiers of the recipient users to receive the image messages. Also, as described earlier, the image message may include a time stamp that indicates when the image message was last edited.

Next, the process advances to a block 1140 where the image message, is sent to another user for display with another mobile device. Additionally, when a CONTACT LIST is selected, the image message is sent (broadcast) to every user included in the CONTACT LIST. The process then moves to the end block and returns to processing other actions.

In alternate embodiments, the present invention may be practiced with the recipients being selected first. The order of selection, i.e. whether the recipients or the images are selected first, is immaterial to the present invention. Accordingly, no such order limitation should be read into claims, even the limitations are necessarily limited by the language, having to recite one limitation before the other.

Figure 9:
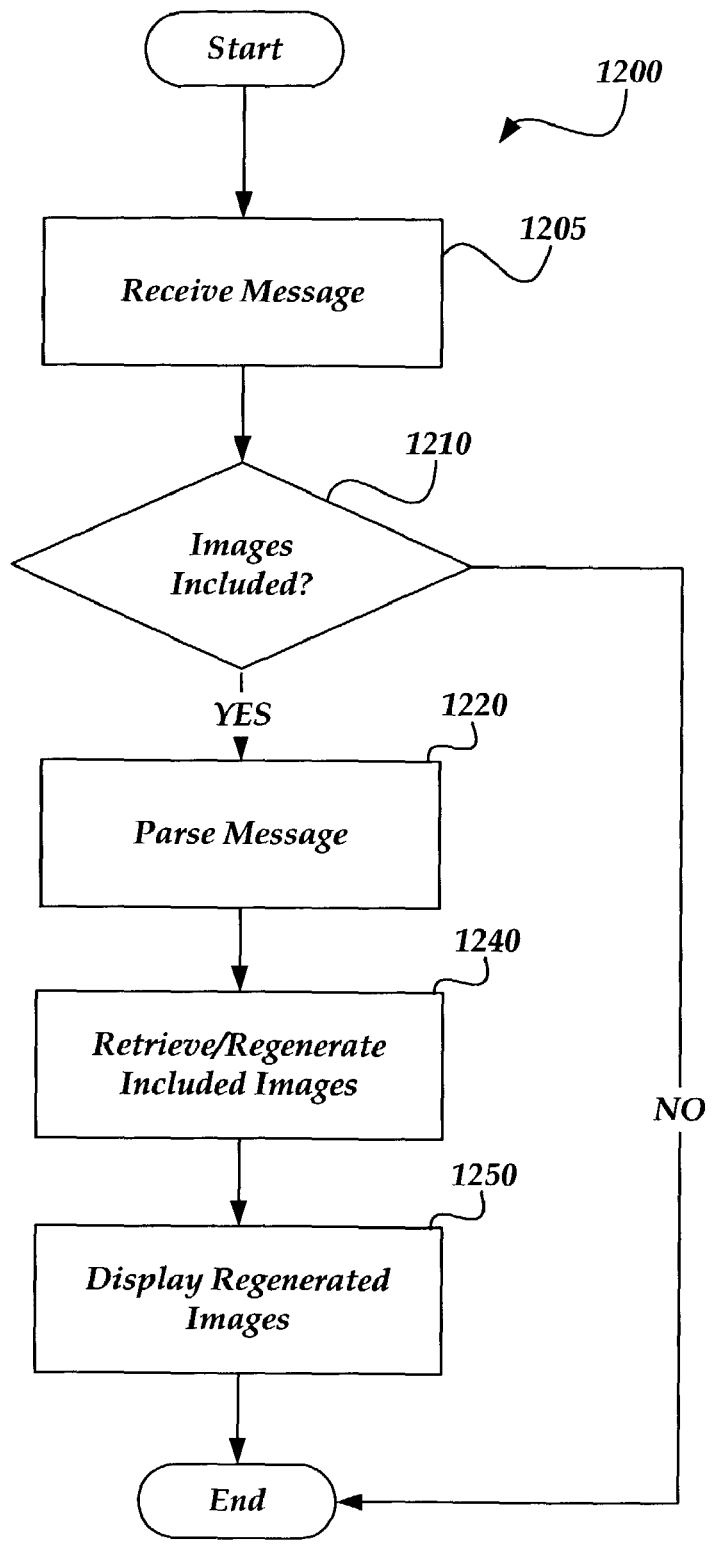
FIG. 9 is a flow chart illustrating a process for receiving and displaying images from other users.

FIG. 9 shows a flowchart 1200 for receiving and displaying selected images sent by a user of a mobile device. Moving from a start block to a block 1205, the process receives a message (e.g. in the form of one or more SMS messages) from a user of a mobile device.

The process advances to a decision block 1210, where a determination is made as to whether the message is an image message. If the message is not an image message, the process advances to an end block and returns to processing other actions.

However, when the message is an image message, the process moves to a block 1220 where the image message is parsed to recover the included image identifiers (or in some embodiments, the images themselves). Upon recovery of the image identifiers, the process flows to a block 1240 where the images are retrieved and regenerated based on the data included in the image message. The identity of the user that sent the image message is also determined. Further, for the embodiment, the time when the image message was generated is ascertained based on the image message data. Then, the amount of elapsed time since the message has been sent may be determined.

For alternate embodiments where actual images are included, the retrieval and regeneration operations are skipped.

Next, the process moves to a block 1250 where the regenerated/recovered images are displayed. For the embodiment, the mobile device also displays the identity of the user that sent the image message and when the images were sent. The process advances to an end block and returns to processing other actions.

In various embodiments where the sender users are associated with an illuminable input key of the mobile device, the process may also include illuminating the illuminable input key. Further, the illuminable input key may also be illuminated with a color, in particular, with different colors to denote the age of a received image message. For example, the color "green" may be employed to depict the image message received from the sender user is a recently received image message. The illuminable input key may subsequently be changed to other colors, such as "yellow" or "red" to depict the advanced age of received image messages.

Server Relayed Image Messaging

Figure 10:
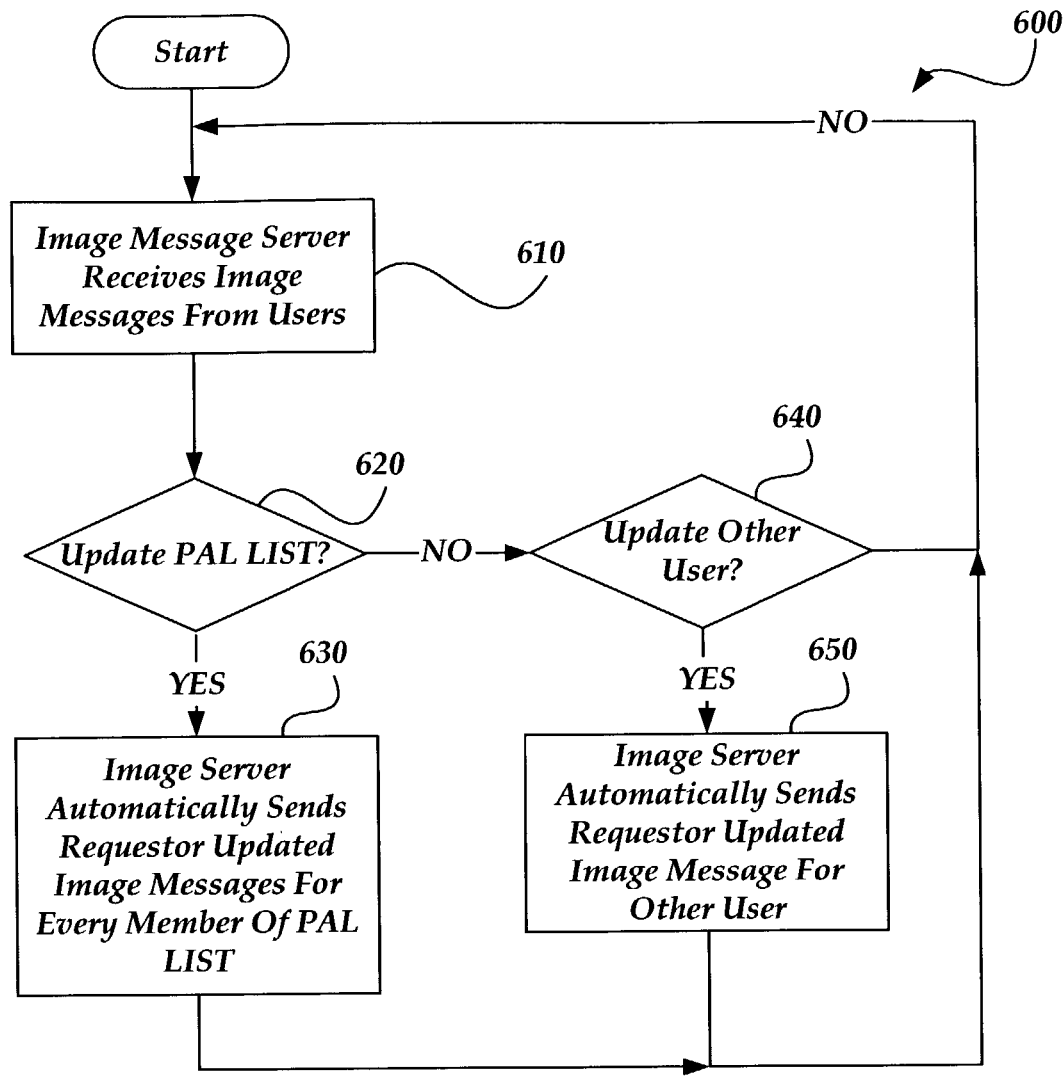
FIG. 10 is a flow chart showing a process for polling for image messages from at least one other member of a list.

FIG. 10 illustrates a process 600 of the present invention for users of mobile devices to request updates for image messages, and automatically receiving new image messages. After a start block, the process advances to block 610, where each image message sent by a user to at least one other user is received and stored by an image message server, such as discussed above in regard to FIG. 3. Also, the image message server keeps a copy of the CONTACT LIST(s) for each user. Further, when a user sends an image message, the user's display of his current image message is automatically updated.

The process moves to decision block 620 where a determination is made if a user of a mobile device has requested for update image messages from each member of a CONTACT LIST. If affirmative, the process advances to block 630 where the image server automatically sends a reply to the user that includes the current image message for each member of the CONTACT LIST. Next, the process jumps to block 610 and performs substantially the same actions as discussed above.

Alternatively, when the determination at decision block 620 is negative, the process moves to decision block 640 where a determination is made whether a user has requested for an update image message from a particular other user. If affirmative, the process moves to block 650 where the image server automatically sends a reply to the user that includes the current image message of the particular other user. Next, the process jumps to block 610 and returns to performing substantially the same actions as discussed above.

Figure 11:
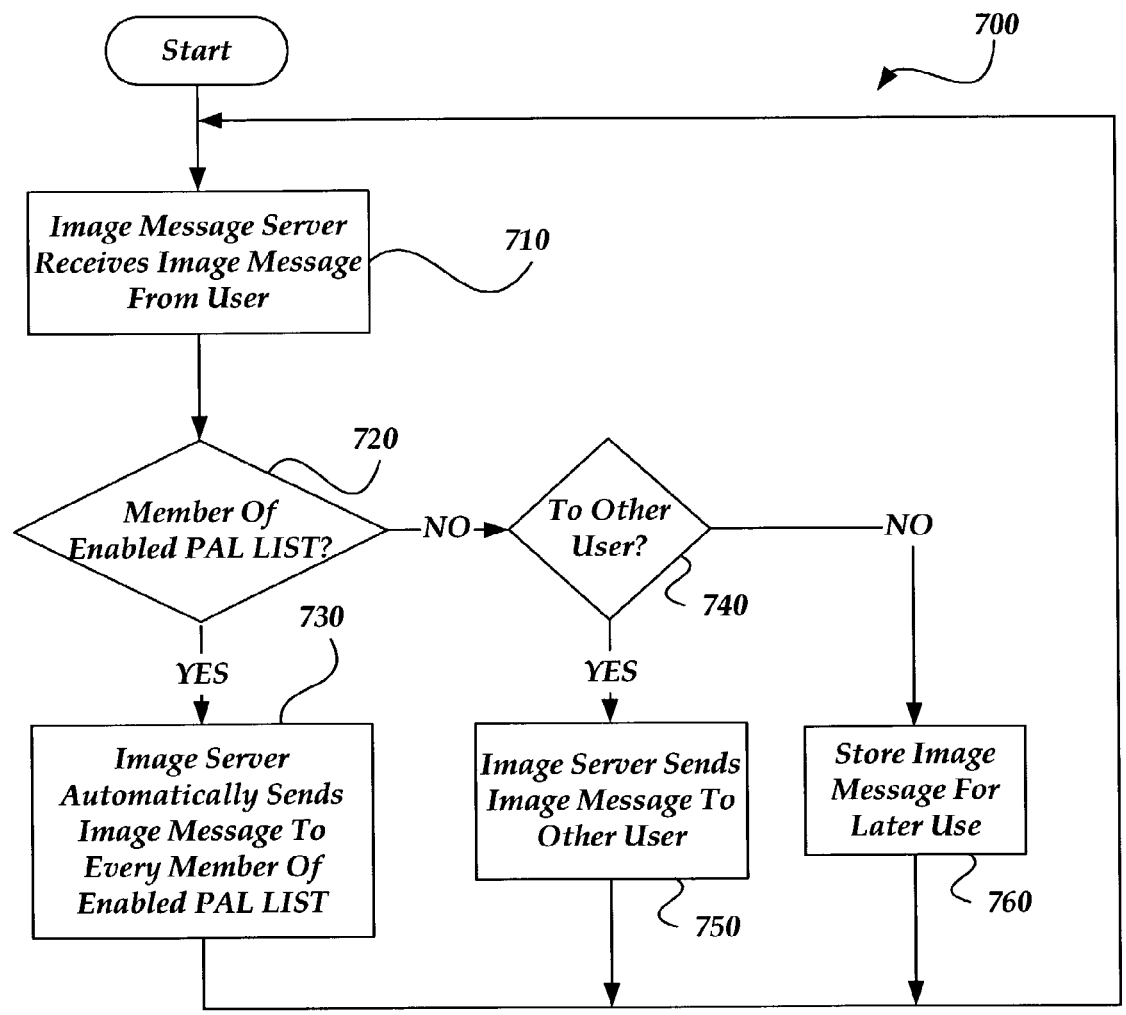
FIG. 11 is a flow chart illustrating a process for broadcasting image message updates to every other member of a list, in accordance with the invention.

FIG. 11 illustrates a process 700 of the present invention for receiving and forwarding image messages. Moving from a start block, the process advances to block 710 where an image message server receives an image message sent by a user. The process flows to decision block 720 where a determination is made as to whether the user has sent an image message for another user that is a member of an enabled CONTACT LIST associated with the user. A member of a CONTACT LIST can be selectively enabled with the feature of automatic sending of each new image message sent by one member to every other member. If affirmative, the process moves to block 730 where the image server broadcasts (sends) the image message to each member of the enabled CONTACT LIST associated with the user. Next, the process jumps to block 710 and performs substantially the same actions as discussed above.

Alternatively, when the determination at decision block 720 is negative, the process advances to decision block 740 where the image server determines if the image message is sent to another user. If affirmative, the process moves to block 750 where the image server automatically forwards the image message to the other user. Next, the process returns to block 710 and performs substantially the same actions as discussed above.

Additionally, when the determination at decision block 740 is negative, the process flows to block 760 and stores the image message for later forwarding by the image message server in response to a request for the current message associated with the user. Also, the display for the user is updated with his current image message. Next, the process returns to block 710 and performs substantially the same actions as discussed above.

Mixed Media Messaging

Figure 12:
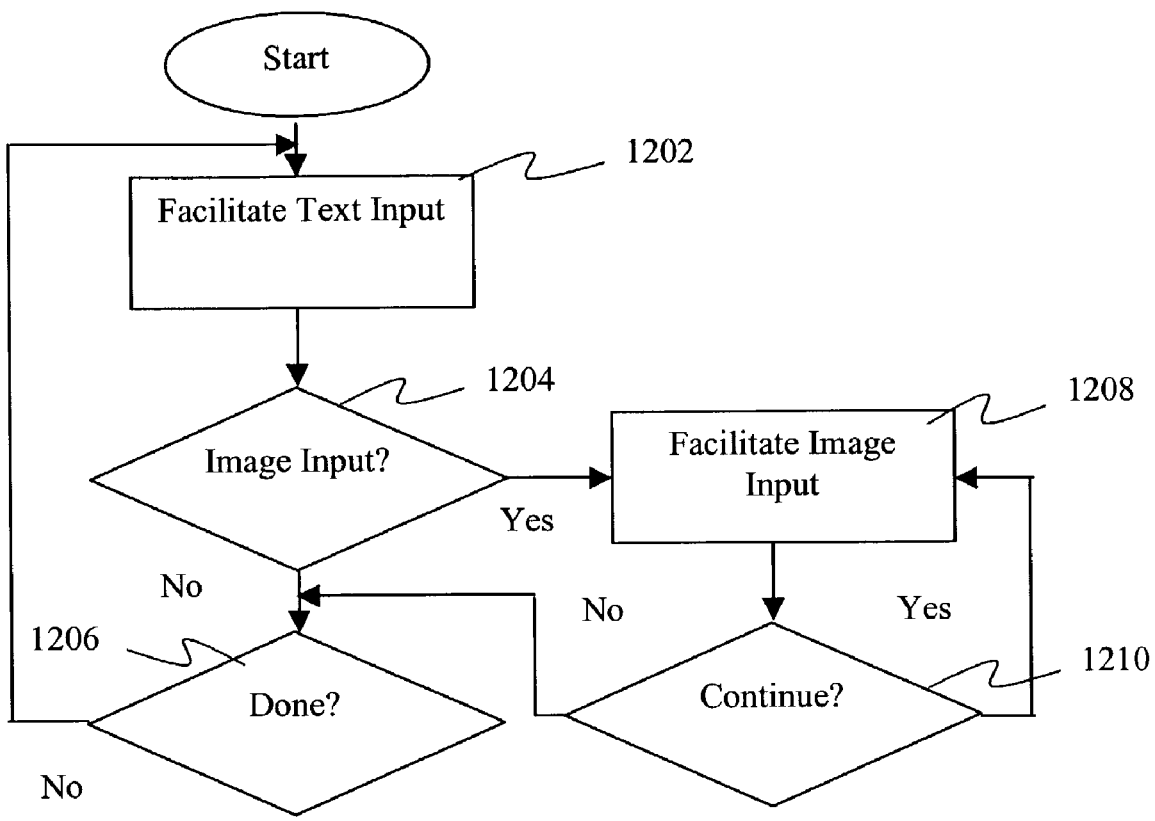
FIG. 12 is a flow chart illustrating a process for communication between users of wireless mobile stations using mixed media messages.

FIG. 12 illustrates process 1200 of the present invention for facilitating communications between users of mobile devices using mixed media messages. For the purpose of the present application, mixed media messages refer to messages having textual and image contents. However, in two degenerate forms, a mixed media message may nevertheless include only textual content in one case, and include only image content in another. In other embodiments, a non-degenerated mixed media message may also include audio, video and other media contents.

As illustrated, in response to the request of the user of a mobile device, the mobile is placed into a text entry mode, in which entry of textual content for a mixed media message by the user is facilitated, block 1202. In the course of facilitating entry of textual content for a mixed media message, determination is continuously made on whether the user has requested inclusion of images (i.e. non-textual contents) into the mixed media message or entry of contents of the mixed media message (textual or image) is completed, blocks 1204–1206.

If entry of contents of the mixed media message is completed, the process terminates. The mixed media message may then be transmitted to one or more recipients, users of other mobile devices.

If entry of contents of the mixed media message is not complete, and inclusion of images has not been requested, the process continues at block 1202, where textual content may continue be entered.

If entry of contents of the mixed media message is not complete, and inclusion of images (i.e. non-textual contents) has been requested, the process continues at block 1208, where selection of one or more images (non-textual contents) for inclusion into the mixed media message is facilitated, block 1210.

In one embodiment, the process of facilitating inclusion of images (non-textual contents) is similar to the earlier described image messaging process. That is, selection of an image (non-textual) category may first be facilitated. Then selection of an image (non-textual content) within the image (non-textual) category is facilitated.

The facilitation of block 1208 is repeated until eventually selection of images (non-textual contents) for inclusion into the mixed media message is completed (at least for now). At such time, the process continues at block 1206. As described earlier, if the entry of contents for the mixed media message has not been completed, the process continues back at block 1202, where entry of textual contents for the mixed media message may be facilitated.

Accordingly, a mixed media message having textual contents and one or more images or other non-textual contents (contiguously included or distributed in different portions of the mixed media message) may be formed.

Figure 13A:
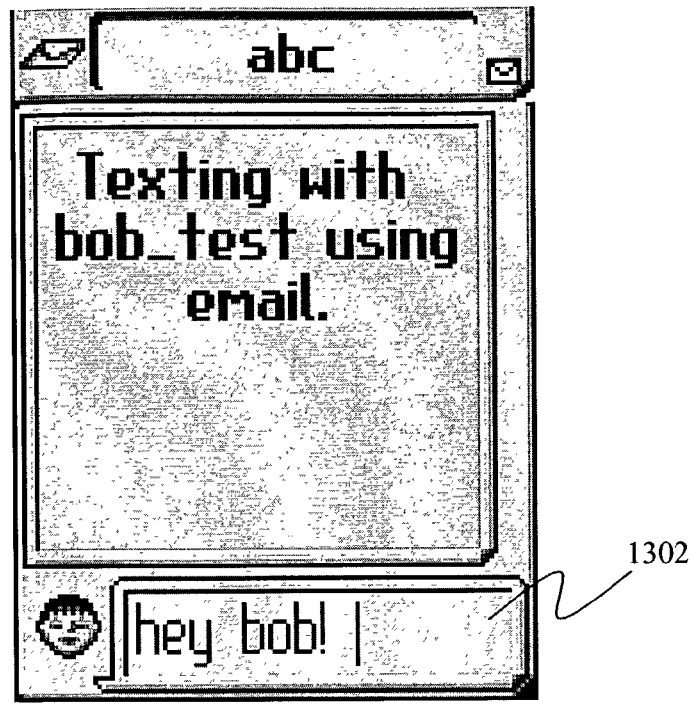
FIGS. 13*a*–13*d* illustrate a number of example screen snapshots for the communication process of FIG. 12.
Figure 13B:
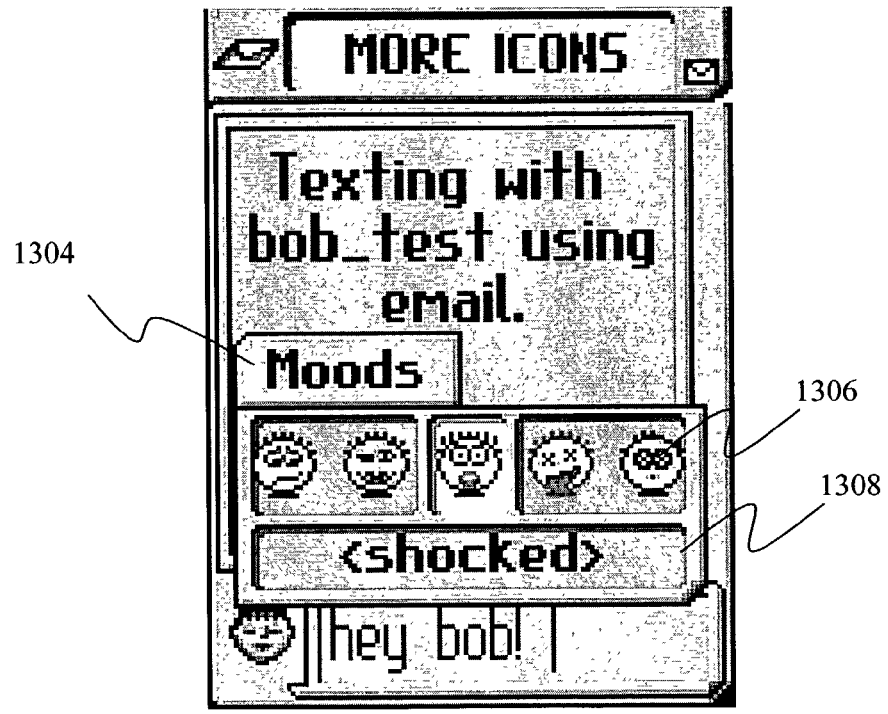

FIGS. 13a–13d illustrate various sample screen shots of the above described mixed media messaging process. FIG. 13a illustrates an example initial state of a mixed media message with only an initial textual portion 1302 having been entered. FIG. 13b illustrates the facilitation of image entry. As described earlier, an image category 1304 may first be selected, then images within the selected image category 1306 may be selected. Note that for the embodiment, each image has a corresponding textual equivalent 1308.

Figure 13C:
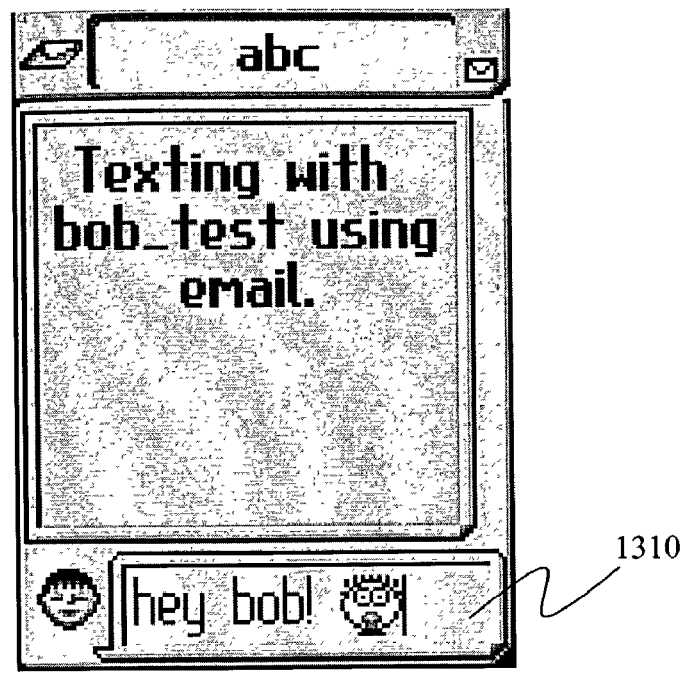
Figure 13D:
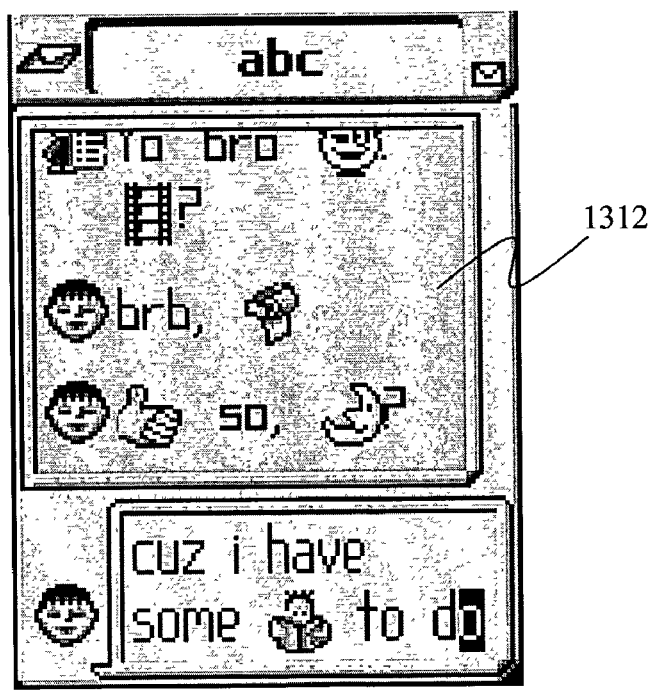

FIG. 13c illustrates an example later state of the mixed media message after a mood image has been selected. FIG. 13d illustrates an example thread of communications employing mixed media messages, with each mixed media message having textual and image contents.

Of course, as described earlier, selected ones of the mixed media messages may be totally textual or include images only.

Figure 14:
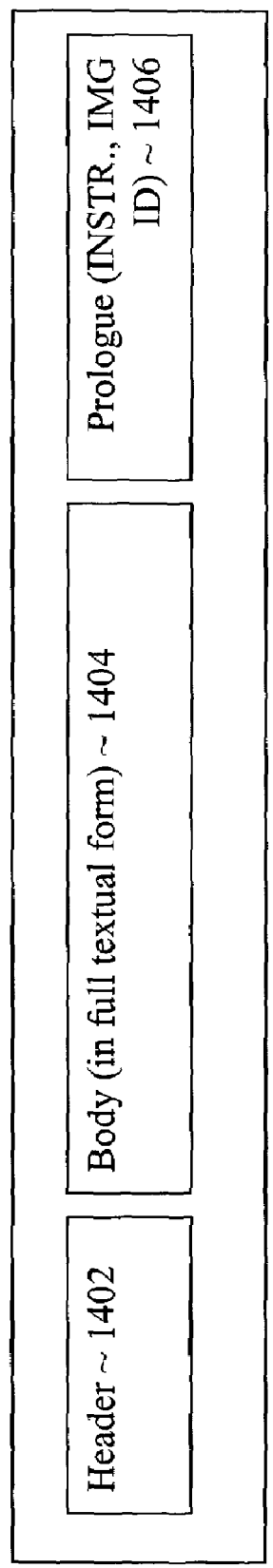
FIG. 14 illustrates an example mixed media message format, in accordance with one embodiment.

FIG. 14 illustrates an example message format for transmitting a mixed media message. As illustrated, message format 1400 includes a message header 1402, a message body 1404 having the textual version of the message, with the one or more included images having been replaced by their textual equivalents. For the embodiment, message format 1400 also includes a prologue portion with instructions identifying the various textual portions that may be replaced with their image equivalents.

In various embodiments, the textual contents may be compressed, e.g. employing a data dictionary. Further, the images may be advantageously identified by their image identifiers, to reduce transmission bandwidth consumption.

Resultantly, upon receipt, message 1400 may be rendered in a full text manner or the mixed media manner, depending on the capability of the wireless mobile device, allowing a wireless mobile device to be interoperable with other wireless mobile devices incorporated with the present invention, as well as legacy devices without the present invention.

That is, for the legacy devices, since it has not been equipped with the teachings of the present invention, its operating logic does not comprehend the extra information, and renders only the textual body of the message, as it is capable of doing. On the other hand, mobile devices of the present invention are equipped to determine the presence of the supplemental instructions. Upon detecting their presence, the operating logic locates the textual contents within the message body having image equivalents as instructed, retrieves the equivalent images (locally or remotely), and replaces the textual contents with image equivalents with the image equivalents, thereby restoring the message into its mixed media form, before rendering the message.

In alternate embodiments, the mixed media message may simply be sent in just its textual form. A mobile device equipped with the present invention may process and enhance the received message, substituting words and/or phrases where image or non-textual equivalents existed, to transform/restore the received textual message into a mixed-media message.

EPILOGUE

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. In a wireless mobile device, a method of operation:
   facilitating a user of the wireless mobile device in selecting a first recipient for a first image message, the first recipient being a user of a first other wireless mobile device and the first image message graphically conveying information about the user of the wireless mobile device;
   facilitating the user of the wireless mobile device in selecting the first image message from a first plurality of image messages; and
   transmitting a selected one of the selected first image message and a first identifier of the selected first image message from the wireless mobile device to the first other wireless mobile device of the first selected recipient to cause the selected first image message to be conveyed to the first selected recipient.

2. The method of claim 1, wherein the method further comprises facilitating the user of the wireless mobile device in selecting a first of a plurality of image message categories, the first image message category having said first plurality of image messages.

3. The method of claim 2, wherein said first plurality of image message categories include at least one of a location image category, a mood image category, an activity image category, a symbol image category, and a face image category.

4. The method of claim 1, wherein the method further comprises tracking and indicating for the user of the wireless mobile device an elapsed amount of time, the selected first image message has been sent to the first other wireless mobile device.

5. The method of claim 1, wherein the method further comprises
   facilitating the user in selecting a second recipient of the first image message, the second recipient being a user of a second other wireless mobile device; and
   transmitting a selected one of the selected first image message and a first identifier of the selected first image message to the second other wireless mobile device of the second selected recipient to cause the selected first image message to be conveyed to the second selected recipient.

6. The method of claim 1, wherein the method further comprises
   facilitating the user of the wireless mobile device in selecting a second recipient for a second image message, the second recipient being a user of a second other wireless mobile device and the second image message graphically conveying information about the user of the wireless mobile device;
   facilitating the user of the wireless mobile device in selecting the second image message from a second plurality of image messages; and
   transmitting a selected one of the selected second image message and a second identifier of the selected second image message to the second other wireless mobile device of the second selected recipient to cause the selected second image message to be conveyed to the second selected recipient.

7. The method of claim 6, wherein the method further comprises tracking and indicating for the user of the first wireless mobile device the first and second selected image messages.

8. The method of claim 6, wherein said first and second plurality of image messages are the same image messages.

9. The method of claim 6, wherein said first and second users are of the same user, and the first and second other wireless mobile devices are the same wireless mobile device.

10. A wireless mobile device comprising:
storage medium having stored therein a plurality of programming instructions designed to
facilitate a user of the wireless mobile device in selecting a first recipient for a first image message, the first recipient being a user of a first other wireless mobile device and the first image message graphically conveying information about the user of the wireless mobile device;
facilitate the user of the wireless mobile device in selecting the first image message from a first plurality of image messages, and
transmit a selected one of the selected first image message and a first identifier of the selected first image message from the wireless mobile device to the first other wireless mobile device of the first selected recipient to cause the selected first image message to be conveyed to the first selected recipient; and
a processor coupled to the storage medium to execute the programming instructions.

11. The wireless mobile device of claim 10, wherein the programming instructions are designed to facilitate the user of the wireless mobile device in selecting a first of a plurality of image message categories having said first plurality of image messages.

12. The wireless mobile device of claim 11, wherein the first plurality of image message categories include at least one of a location image category, a mood image category, an activity image category, a symbol image category, and a face image category.

13. The wireless mobile device of claim 10, wherein the programming instructions are further designed to track and indicate for the user of the wireless mobile device an elapsed amount of time, the selected first image message has been sent to the first other wireless mobile device.

14. The wireless mobile device of claim 10, wherein the programming instructions are further designed to
facilitate the user in selecting a second recipient of the first image message, the second recipient being a user of a second other wireless mobile device; and
transmit a selected one of the selected first image message and a first identifier of the selected first image message to the second other wireless mobile device of the second selected recipient to cause the selected first image message to be conveyed to the second selected recipient.

15. The wireless mobile device of claim 10, wherein the programming instructions are further designed to
facilitate the user of the wireless mobile device in selecting a second recipient for a second image message, the second recipient being a user of a second other wireless mobile device and the second image message graphically conveying information about the user of the wireless mobile device;
facilitate the user of the wireless mobile device in selecting the second image message from a second plurality of image messages,
transmit a selected one of the selected second image message and a second identifier of the selected second image message to the second other wireless mobile device of the second selected recipient to cause the second selected image message to be conveyed to the second selected recipient.

16. The wireless mobile device of claim 15, wherein the programming instructions are designed to track and indicate for the user of the wireless mobile device the first and second selected image message.

17. The wireless mobile device of claim 15, wherein said first and second plurality of image messages are the same image messages.

18. The wireless mobile device of claim 15, wherein said first and second users are of the same user, and the first and second other wireless mobile devices are the same wireless mobile device.

19. In a wireless mobile device, a method of operation:
receiving a selected one of a first image message and a first identifier of the first image message from a first other wireless mobile device for conveyance of first information about a user of the first other wireless mobile device to a user of the wireless mobile device; and
displaying the first image message to convey the first information about the user of the first other wireless mobile device to the user of the wireless mobile device.

20. The method of claim 19, wherein said receiving comprises receiving the first identifier of the first image message, and the method further comprises retrieving the first image message for display, using the received first identifier of the first image message.

21. The method of claim 19, wherein the first image message is an image message of a first of a plurality of image message categories, including at least one of a location image category, a mood image category, an activity image category, a symbol image category, and a face image category.

22. The method of claim 19, wherein the method further comprises tracking and indicating for the user of the wireless mobile device an elapsed amount of time, the first image message has been received and displayed.

23. The method of claim 19, wherein the method further comprises determining an illuminable input key corresponding to the user of the first other wireless mobile device; and
illuminating the illuminable input key corresponding to the user of the first other wireless mobile device.

24. The method of claim 19, wherein the method further comprises
receiving a selected one of a second image message and a second identifier of the second image message from a second other wireless mobile device for conveyance of second information about a user of the second other wireless mobile device to a user of the wireless mobile device; and
displaying the second image message to convey the second information about the user of the second other wireless mobile device to the user of the wireless mobile device.

25. The method of claim 24, wherein the method further comprises tracking and indicating for the user of the wireless mobile device the first and second image messages.

26. The method of claim 25, wherein the first and second other wireless mobile devices are the same wireless mobile device.

27. A wireless mobile device comprising:
storage medium having stored therein a plurality of programming instructions designed to
receive a selected one of a first image message and a first identifier of the first image message from a first other wireless mobile device for conveyance of first information about a user of the first other wireless mobile device to a user of the wireless mobile device, and
displaying the first image message to convey the first information about the user of the first other wireless mobile device to the user of the wireless mobile device; and
at least one processor coupled to the storage medium to execute the plurality of programming instructions.

28. The wireless mobile device of claim 27, wherein the programming instructions are further designed to retrieve the first image message for display, using the received first identifier of the first image message, when the first identifier of the first image message is received.

29. The wireless mobile device of claim 27, wherein the first image message is an image message of a first of a plurality of image message categories, including at least one of a location image category, a mood image category, an activity image category, a symbol image category, and a face image category.

30. The wireless mobile device of claim 27, wherein the programming instructions are further designed to track and indicate for the user of the wireless mobile device an elapsed amount of time, the first image message has been received and displayed.

31. The wireless mobile device of claim 27, wherein the programming instructions are further designed to
determine an illuminable input key corresponding to the user of the first other wireless mobile device; and
illuminate the illuminable input key corresponding to the user of the first other wireless mobile device.

32. The wireless mobile device of claim 27, wherein the programming instructions are further designed to
receive a selected one of a second image message and a second identifier of the second image message from a second other wireless mobile device for conveyance of second information about a user of the second other wireless mobile device to a user of the wireless mobile device; and
display the second image message to convey the second information about the user of the second other wireless mobile device to the user of the wireless mobile device.

33. The wireless mobile device of claim 32, wherein the programming instructions are further designed to track and indicate for the user of the wireless mobile device the first and second image messages.

34. The wireless mobile device of claim 33, wherein the first and second other wireless mobile devices are the same wireless mobile device.

35. In a computing environment, a method comprising:
receiving from a plurality of users of wireless mobile devices, image messages conveying information about the users,
storing at least the latest version of the received image message for each of the users;
receiving a request for an update from one of the users; and
responding to the requesting with the latest versions of the received image messages of the users.

36. The method of claim 35, wherein each image message comprise at least one image from an image category selected from a mood image category, an activity image category, a location image category, a symbol image category, and a face image category.

37. An apparatus comprising:
storage medium having stored therein a plurality of programming instructions designed to
receive from a plurality of users of wireless mobile devices, image messages conveying information about the users,
store at least the latest version of the received image message for each of the users,
receive a request for an update from one of the users, and
respond to the requesting with the latest versions of the received image messages of the users; and
at least one processor coupled to the storage medium to execute the programming instructions.

38. The apparatus of claim 37, wherein each image message comprise at least one image from an image category selected from a mood image category, an activity image category, a location image category, a symbol image category, and a face image category.

* * * * *